F. SCHAUMBURG.
Harrow.

No. 206,490. Patented July 30, 1878.

Witnesses
Edward Milton
Buther Thurlow

Inventor
Frank Schaumburg
by E. Thurlow,
his atty (in fact.)

UNITED STATES PATENT OFFICE.

FRANK SCHAUMBURG, OF CRUGER, ILLINOIS.

IMPROVEMENT IN HARROWS.

Specification forming part of Letters Patent No. 206,490, dated July 30, 1878; application filed May 3, 1878.

*To all whom it may concern:*

Be it known that I, FRANK SCHAUMBURG, of Cruger, in the county of Woodford, in the State of Illinois, have invented an Improvement in Harrows; and do hereby declare that the following is a full, clear, and exact description thereof, reference being had to the annexed drawings, making a part of this specification, in which like letters of reference refer to like parts, and in which—

Figure 1:
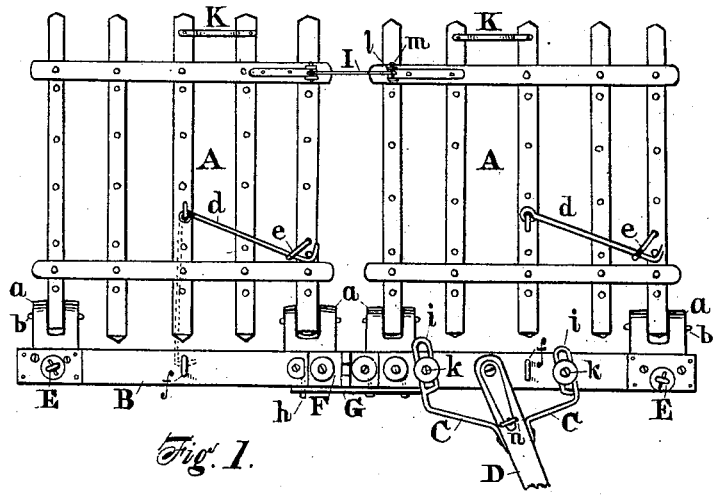
Figure 2:
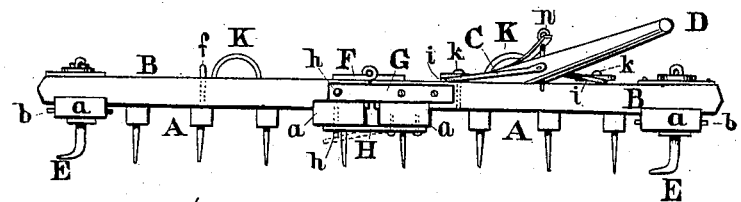
Figure 3:
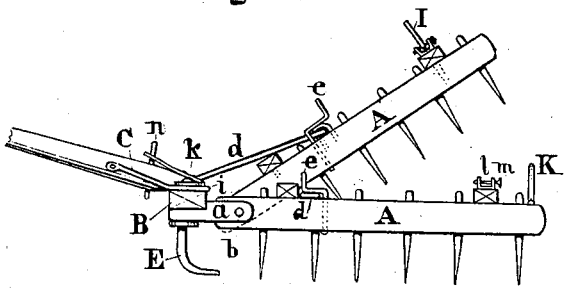

Figure 1 represents a plan view; Fig. 2, a front elevation; Fig. 3, a side elevation.

This invention consists, first, in the combination of a draft-tongue with the transverse horizontal bar to which the harrows are coupled or hinged, the tongue being adjustably attached to the middle of said bar, or at either side of same, (*i. e.*, middle,) in such a mode as (by adjustment of same on a pivot to right or left) to "angle" the harrows, or cause the teeth of the same to track or diverge more or less, one from the other, in scratching the soil; second, in combining with said feature an already-known plan of making the bar in one or more divisions, jointed together, so as to fold; also, the known plan of suspending the harrows at an angle with the soil; also, the known plan of supporting the bar to which the harrows are hinged upon runners or swivel-feet.

To carry out the first-mentioned feature I pivot the heel of the draft-tongue to transverse bar at an oblique angle, where it is held at desired angles with the line of draft by means of a side brace or braces, or similar detent. The bar is of convenient length for the hinging thereto of several harrows abreast, having for this purpose jaws or eyes for bolts or pins.

One of the forms in which I construct this harrow is as follows: A A are quadrilateral harrows, each hinged at the front at separate corners to one of the jaws *a*, projecting from the rear of the bar B, where they are respectively pivoted by means of a bolt, *b*. Each harrow has a rod, *d*, attached loosely at one end, by means of an eye, to the harrow, the free end having a hook to detain it (to elevate said harrow) in an eye or staple, *f*, in the bar B, which rod is secured, when not in use, beneath a small crank-like catch, *e*, in the surface of the harrow.

B is the transverse bar, to which the line of harrows A are hinged by means of said jaws *a* and bolts *b*. Said jaws are here simply slotted horizontal blocks secured to the inferior surface of the bar. Opposite each harrow is fixed (in said bar) a staple or eye, *f*, to act as detents for the respective hooks *d*.

D represents the draft-tongue, pivoted at a vertical and also a horizontal angle with and upon said bar B, where it is adjustably held at desired angles laterally by means of lateral braces C C, each secured permanently to opposite sides of the tongue, but ending on said bar B in a slot or loop, *i*, for the admission of a detent or screw, *k*; E, the transporting-runners, consisting of a swivel-foot or bent slide socketed each in the end of said bar vertically, so as to sustain the whole weight of bar and harrow (when the latter are raised, as stated) during transportation along the ground to or from the place of operation.

F is the hinge connecting the separate divisions of the bar B. G represents a spring plate or brace fastened at one end, so as to cross the joint between said divisions of the bar B, being provided with an eye to fit upon a lug or pin, *h*, projecting from the surface of the bar beneath it, so operating to maintain the rigidity of said bar B (despite the hinge F) when harrowing. H is a similar brace for the same purpose as the one, G, just described. One of these may be found to be efficient without the use of the other.

I is a coupling to connect adjoining harrows at their tails, (while operating in newly-plowed sod, &c.,) consisting of a short rod, 1, pivoted to one harrow, having its free end provided with an eye to receive a bolt, *m*, of the jaw *l* on the adjoining harrow. K K are arched handles or lifts respectively attached to the tail of one of the harrows, by which to raise same for the usual purposes.

I do not confine my invention to the use of but two harrows, as more can be attached with good effect.

What I claim as my invention is—

1. The combination of a transverse draft-bar, having several attached harrows, with a draft-tongue adjustably attached upon the front of said bar, adjustable for the purpose of angling the draft or course of said harrows more or less obliquely, as described.

2. A harrow having a laterally-adjustable oblique tongue pivoted upon a transverse bar, to which the harrows are hinged or jointed abreast.

3. In a harrow, the combination, with the tongue D and bar B, of the side braces C C, for the purpose of angling the harrows, substantially as described.

4. The combination and arrangement of the bar B, braces C, and tongue D, as described.

5. In a harrow with angling adjustable tongue D and bar B, supported on runners E, the two or more harrows A A, having temporary connection I in the rear in adjoining harrows, as described.

In testimony that I claim the foregoing improvement in harrows I have hereunto set my hand this 26th day of April, A. D. 1878.

FRANK SCHAUMBURG.

Witnesses:
JAMES M. MORSE,
LUTHER THURLOW.